(12) United States Patent
Jammalamadaka et al.

(10) Patent No.: US 9,135,330 B2
(45) Date of Patent: Sep. 15, 2015

(54) QUERY EXPANSION CLASSIFIER FOR E-COMMERCE

(71) Applicants: Ravi Chandra Jammalamadaka, Campbell, CA (US); Vamsi Krishna Salaka, Fremont, CA (US); Brian Scott Johnson, Campbell, CA (US); Tracy Holloway King, Mountain View, CA (US)

(72) Inventors: Ravi Chandra Jammalamadaka, Campbell, CA (US); Vamsi Krishna Salaka, Fremont, CA (US); Brian Scott Johnson, Campbell, CA (US); Tracy Holloway King, Mountain View, CA (US)

(73) Assignee: eBay Inc., San Jose, CA (US)

( * ) Notice: Subject to any disclaimer, the term of this patent is extended or adjusted under 35 U.S.C. 154(b) by 256 days.

(21) Appl. No.: 13/718,727

(22) Filed: Dec. 18, 2012

(65) Prior Publication Data

US 2014/0172815 A1    Jun. 19, 2014

(51) Int. Cl.
   *G06F 17/30* (2006.01)
(52) U.S. Cl.
   CPC .... *G06F 17/30672* (2013.01); *G06F 17/30864* (2013.01)
(58) Field of Classification Search
   CPC .................. G06F 17/30672; G06F 17/30864
   USPC ........................ 707/765, 766, 767, E17.074
   See application file for complete search history.

(56) References Cited

U.S. PATENT DOCUMENTS

| | | | |
|---|---|---|---|
| 8,352,488 B2 * | 1/2013 | Fleming et al. | 707/768 |
| 2004/0249808 A1 * | 12/2004 | Azzam et al. | 707/4 |
| 2008/0104056 A1 * | 5/2008 | Li et al. | 707/5 |
| 2009/0076927 A1 * | 3/2009 | Sridhar et al. | 705/26 |
| 2010/0306227 A1 * | 12/2010 | Fleming et al. | 707/763 |
| 2012/0036123 A1 * | 2/2012 | Hasan et al. | 707/723 |
| 2013/0339311 A1 * | 12/2013 | Ferrari et al. | 707/687 |
| 2013/0339379 A1 * | 12/2013 | Ferrari et al. | 707/766 |

* cited by examiner

*Primary Examiner* — Phong Nguyen

(74) *Attorney, Agent, or Firm* — Schwegman Lundberg & Woessner, P.A.

(57) ABSTRACT

A system and method of query expansion are disclosed. A query expansion source, a query expansion candidate, and feature data for the query expansion source and the query expansion candidate are received. The feature data comprises information for a plurality of features. A determination is made as to whether the query expansion candidate qualifies as an expansion of the query expansion source based on an analysis of the information for the plurality of features. The query expansion candidate is assigned as an expanded query of the query expansion source in a query expansion dictionary in response to a determination that the query expansion candidate qualifies as an expansion of the query expansion source.

15 Claims, 7 Drawing Sheets

FIG. 5

QUERY EXPANSION CLASSIFIER FOR E-COMMERCE

TECHNICAL FIELD

The present application relates generally to the technical field of search query processing, and, in various embodiments, to systems and methods of query expansion.

BACKGROUND

It is important for search engines to match user expectations. When executed in its original form, a search query submitted by a user may not retrieve all of the relevant documents or item listings. For example, the search query "earphones" may not return results for "earbuds," even though the two queries are related to each other.

There are many reasons for a search engine being unable to match a user's expectations for a search query. Some reasons include differences in language models (e.g., "color" in American English versus "colour" in British English), acronym/abbreviation issues (e.g., "PS3" and "PlayStation 3"), spacing issues ("J crew" and "Jcrew"), synonym issues (e.g., "wedding dress" and "bridal gown"), and stemming issues (e.g., "van" and "Vans").

BRIEF DESCRIPTION OF THE DRAWINGS

Some embodiments of the present disclosure are illustrated by way of example and not limitation in the figures of the accompanying drawings, in which like reference numbers indicate similar elements, and in which:

FIG. 5 illustrates an example embodiment of search results for a false positive query expansion pair;

DETAILED DESCRIPTION

Figure 1:
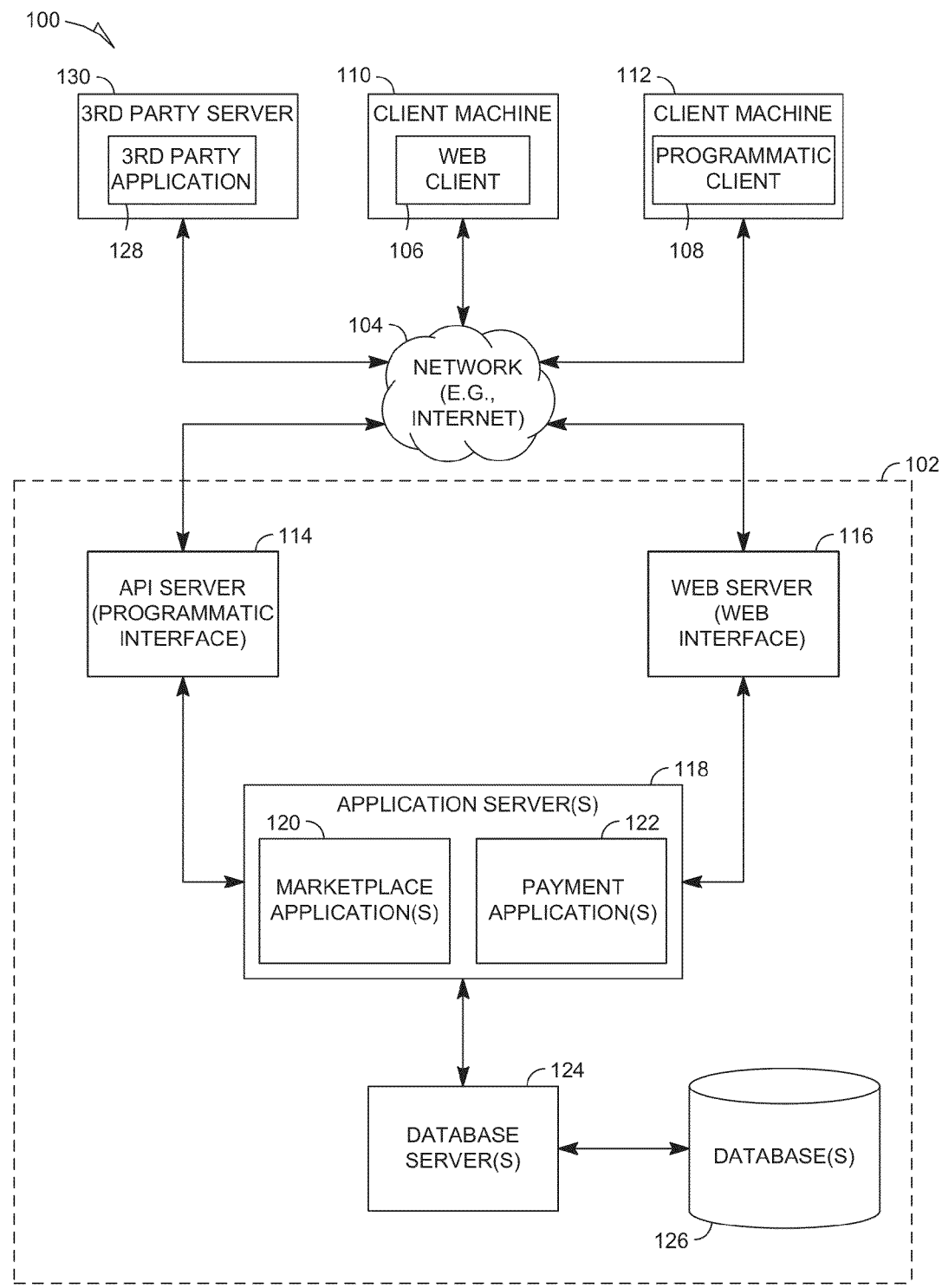
FIG. 1 is a block diagram depicting a network architecture of a system, according to some embodiments, having a client-server architecture configured for exchanging data over a network.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The present disclosure provides systems and methods of query expansion. Some e-commerce websites (e.g., eBay) have a rich corpus of item listings and queries that can be leveraged by a classifier. Multi-dimensional feature data can be extracted from the corpus for a query expansion source and a query expansion candidate and fed into the classifier. For example, for every given keyword phrase pair $K_1$ and $K_2$, feature data $\{F_1, F_2 \ldots F_n\}$ can be generated, where n is the number of different features that are generated. The keyword phrase pair and its corresponding feature data can then be fed into the classifier. Due to the richness of the feature data, the classifier can now determine whether a query expansion candidate (e.g., $K_2$) in a keyword phrase pair is qualified to be an expansion of a query expansion source (e.g., $K_1$) in the keyword phrase pair with high accuracy and a tow false-positive rate.

In some embodiments, a system may comprise at least one processor and a query expansion classifier module. The query expansion classifier module may be executable by the at least one processor, and may be configured to receive a query expansion source, a query expansion candidate, and feature data for the query expansion source and the query expansion candidate. The feature data may comprise information for a plurality of features. The query expansion classifier module may also be configured to determine whether the query expansion candidate qualifies as an expansion of the query expansion source based on an analysis of the information for the plurality of features, and to assign the query expansion candidate as an expanded query of the query expansion source in a query expansion dictionary in response to a determination that the query expansion candidate qualifies as an expansion of the query expansion source.

In some embodiments, the system further comprises a feature extractor module configured to extract the feature data from data of an e-commerce website. The data of the e-commerce website may comprise at least one of user behavioral data and item listing data.

In some embodiments, a computer-implemented method comprises receiving a query expansion source, a query expansion candidate, and feature data for the query expansion source and the query expansion candidate. The feature data may comprise information for a plurality of features. A determination may be made as to whether the query expansion candidate qualifies as an expansion of the query expansion source based on an analysis of the information for the plurality of features. The query expansion candidate may be assigned as an expanded query of the query expansion source in a query expansion dictionary in response to a determination that the query expansion candidate qualifies as an expansion of the query expansion source.

In some embodiments, the feature data may be extracted from data of an e-commerce website. The data of the e-commerce website may comprise at least one of user behavioral data and item listing data.

In some embodiments, the plurality of features may comprise a measure of co-occurrence for the query expansion source and the query expansion candidate in item listings of an e-commerce website. In some embodiments, the plurality of features may comprise a measure of neighborhood similarity for the query expansion source and the query expansion candidate. The measure of neighborhood similarity may be a measure of similarity of words that surround both the query expansion source and the query expansion candidate within a window span of a predetermined number of words in item listings of an e-commerce website. In some embodiments, the plurality of features may comprise a measure of category divergence for the query expansion source and the query expansion candidate. The measure of category divergence may be a measure of similarity between a distribution of item categories of item listings returned as results for a search on the query expansion source and a distribution of item categories of item listings returned as results for a search on the query expansion candidate. In some embodiments, the plurality of features may comprise a measure of price divergence for the query expansion source and the query expansion candidate. The measure of price divergence may be a measure of similarity between a distribution of prices of item listings returned as results for a search on the query expansion source and a distribution of prices of item listings returned as results for a search on the query expansion candidate. In some embodiments, the measure of price divergence may comprise a Student's t-statistic.

In some embodiments, a non-transitory machine-readable storage device may store a set of instructions that, when executed by at least one processor, causes the at least one processor to perform the operations discussed within the present disclosure.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)) to one or more clients. FIG. 1 illustrates, for example, a web client 106 (e.g., a browser, such as the Internet Explorer browser developed by Microsoft Corporation of Redmond, Wash. State) and a programmatic client 108 executing on respective client machines 110 and 112.

An API server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
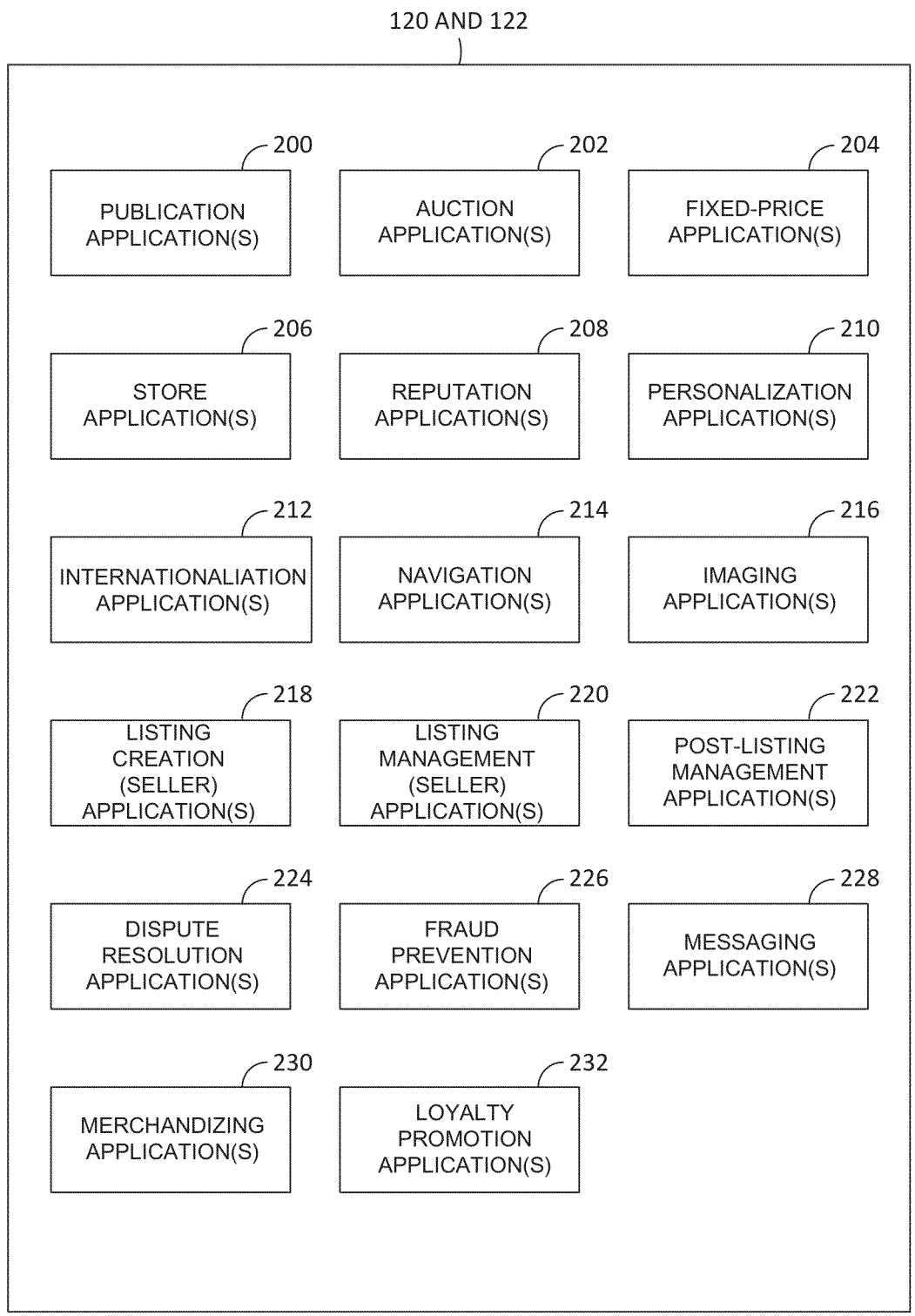
FIG. 2 is a block diagram depicting various components of a network-based publisher, according to some embodiments.

FIG. 2 is a block diagram illustrating multiple marketplace and payment applications 120 and 122 that, in one example embodiment, are provided as part of the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may, furthermore, access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page on which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may, accordingly, include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make the listings available via the networked system 102, as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, on as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such as, for example, messages advising users regarding the status of listings at the networked system 102 (e.g., providing "outbid" notices to bidders during an auction process or to providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

Figure 3:
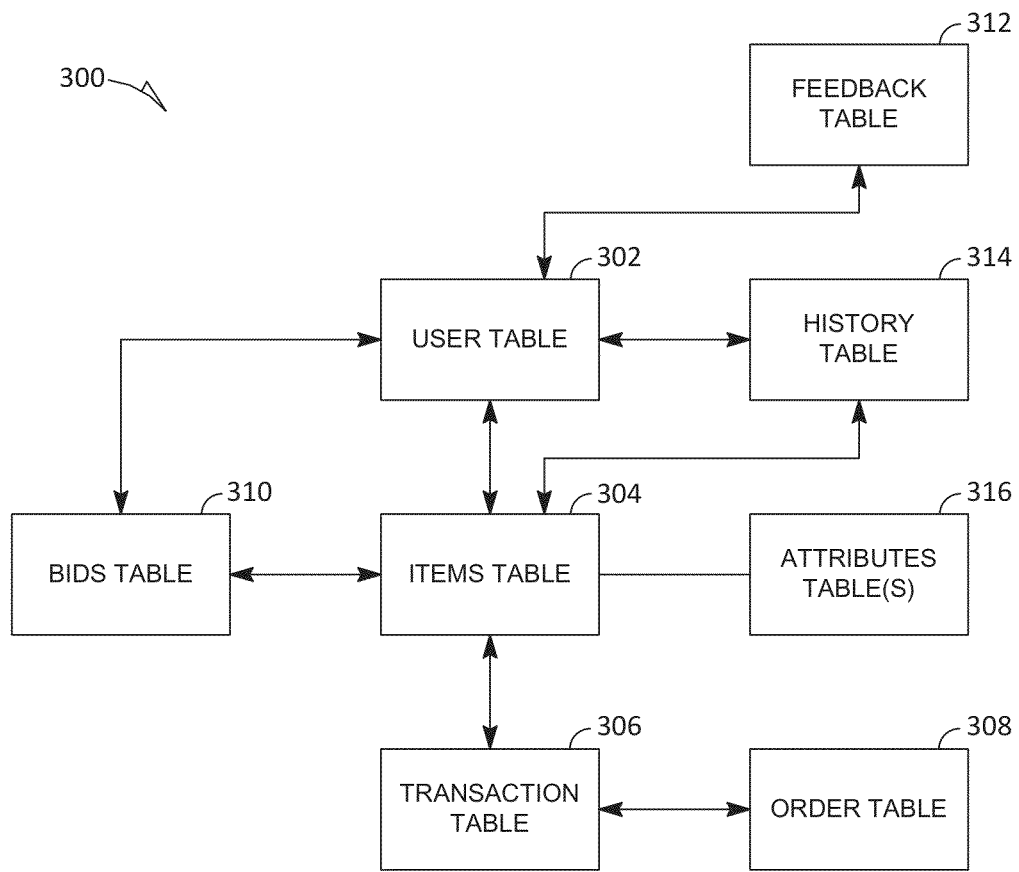
FIG. 3 is a block diagram depicting an example embodiment of various tables that may be maintained within a database.

FIG. 3 is a high-level entity-relationship diagram, illustrating various tables 300 that may be maintained within the database(s) 126, and that are utilized by and support the applications 120 and 122. A user table 302 contains a record for each registered user of the networked system 102, and may include identifier, address and financial instrument information pertaining to each such registered user. A user may operate as a seller, a buyer, or both, within the networked system 102. In one example embodiment, a buyer may be a user that has accumulated value (e.g., commercial or proprietary currency), and is accordingly able to exchange the accumulated value for items that are offered for sale by the networked system 102.

The tables 300 also include an items table 304 in which are maintained item records for goods and services that are available to be, or have been, transacted via the networked system 102. Each item record within the items table 304 may furthermore be linked to one or more user records within the user table 302, so as to associate a seller and one or more actual or potential buyers with each item record.

A transaction table 306 contains a record for each transaction (e.g., a purchase or sale transaction) pertaining to items for which records exist within the items table 304.

An order table 308 is populated with order records, each order record being associated with an order. Each order, in turn, may be with respect to one or more transactions for which records exist within the transaction table 306.

Bid records within a bids table 310 each relate to a bid received at the networked system 102 in connection with an auction-format listing supported by an auction application 202. A feedback table 312 is utilized by one or more reputation applications 208, in one example embodiment, to construct and maintain reputation information concerning users. A history table 314 maintains a history of transactions to which a user has been a party. One or more attributes tables 316 record attribute information pertaining to items for which records exist within the items table 304. Considering only a single example of such an attribute, the attributes tables 316 may indicate a currency attribute associated with a particular item, the currency attribute identifying the currency of a price for the relevant item as specified by a seller.

Figure 4:
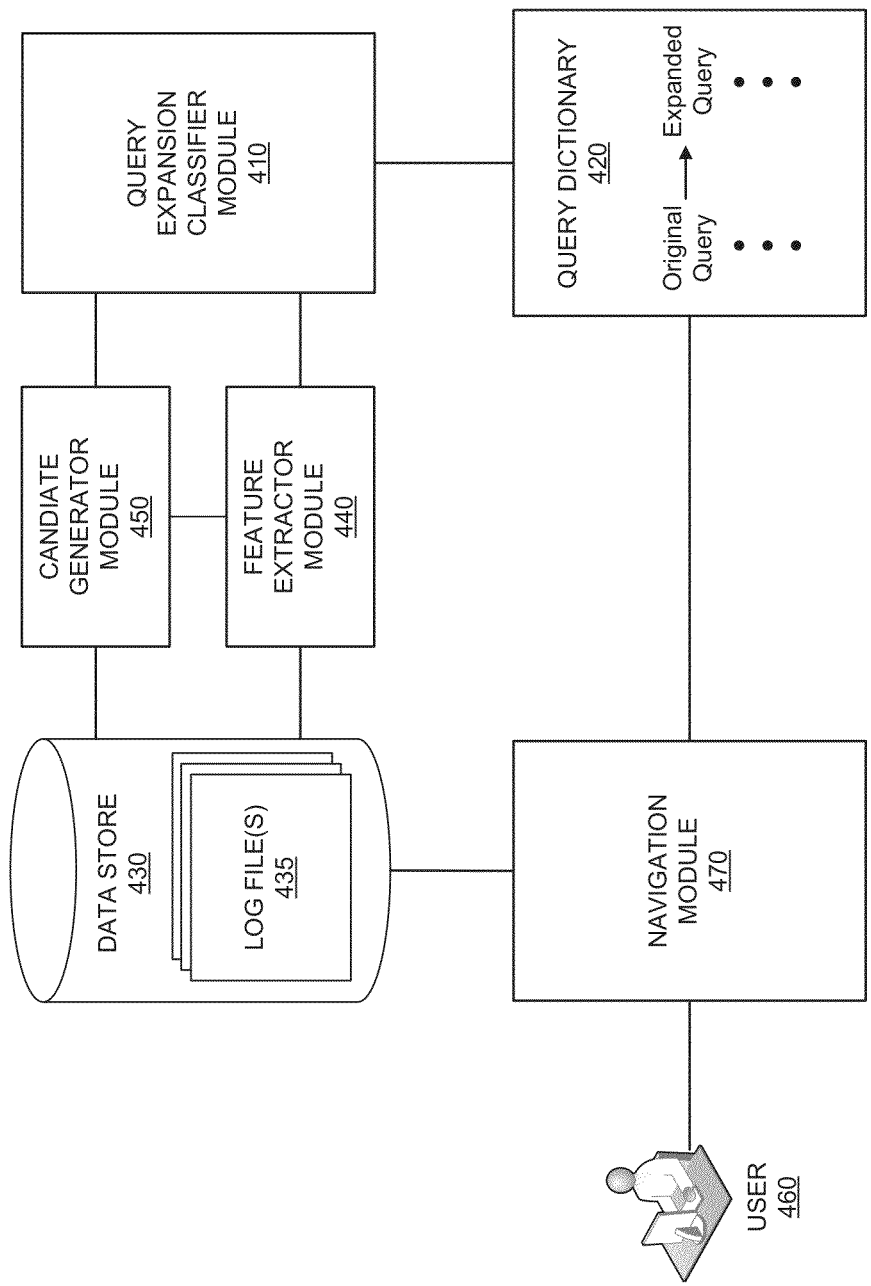
FIG. 4 is a block diagram illustrating an example embodiment of a query expansion system.

FIG. 4 is a block diagram illustrating an example embodiment of a query expansion system 400. In some embodiments, the components of the query expansion system 400 may be incorporated into or implemented using the components of system 100 in FIG. 1. For example, the modules of the query expansion system 400 may be incorporated into the one or more marketplace applications 120 and/or payment applications 122, and the data storage components of the query expansion system 400 may be incorporated into the one or more databases 126.

The query expansion system 400 may comprise a query expansion classifier module 410. The query expansion classifier module 410 may be executable by one or more processors, and may be configured to receive a query expansion source and a query expansion candidate, as well as feature data for the query expansion source and the query expansion candidate. The feature data may comprise information thr a plurality of features.

The query expansion classifier module 410 may also be configured to determine whether the query expansion candidate qualifies as an expansion of the query expansion source based on an analysis of the information for the plurality of features. The query expansion classifier module 410 may be configured to assign the query expansion candidate as an expanded query of the query expansion source in a query expansion dictionary 420 in response to a determination that the query expansion candidate qualifies as an expansion of the query expansion source.

In some embodiments, the query expansion classifier module 410 may receive the query expansion source and candidate from a candidate generator module 450. In some embodiments, the candidate generator module 450 may be configured to generate the query expansion source and candidate using information from a data store 430. This information may comprise user behavioral data and/or item listing data. The data store 430 may comprise one or more databases (e.g., database(s) 126 in FIG. 1). In some embodiments, the data store 430 may store one or more log files 435. The log files 435 may comprise information and identifiers for item listings of an e-commerce website. The log files 435 may also comprise original search queries that resulted in a user action directed towards one or more of the item listings. For example, a user may have entered the term "jet ski" in an e-commerce website's search field and been presented with several item listings, one of which is an item listing entitled "2004 Kawasaki SXR 800 Jetski." In this example, if the user selected (e.g., clicked) on the "2004 Kawasaki SXR 800 Jetski" item listing to view the item, a record of this action may be stored in a log file 435. In some embodiments, clickstream data directed towards an item listing and representing user actions may be stored in the log file 435, along with the targeted item listing and the search query from which the user action resulted. In the example above, the log file 435 may store information indicating that, for the "2004 Kawasaki SXR 800 Jetski" item listing, a user viewed the item as a consequence of performing a search on "jet ski."

In some embodiments, the item listings for which information and identifiers are stored in the data store 430 may comprise live item listings and completed item listings. A live item listing is an item listing for which the item is currently being offered. A completed item listing is an item listing for which the item is not currently being offered (e.g., the item can no longer be purchased via the item listing). In some embodiments, completed item listings may comprise an item listing that has expired, an item listing for which the item has already been sold, and an item listing that has been canceled by the seller of the item or by the e-commerce site hosting the item listing.

The candidate generator module 450 may be configured to generate the query expansion source and candidate using any one or combination of algorithms. In some embodiments, the candidate generator module 450 may be configured to generate the query expansion source and candidate by learning from the user behavioral data stored in the data store 430. For example, the candidate generator module 450 may be configured to generate the query expansion source and candidate based on a query transition from a first keyword phrase to a second keyword phrase. A user may submit Q1 as the first keyword phrase for search, and then, in the same session, submit Q2 as the second keyword phrase for search. The candidate generator module 450 may interpret the substitution of Q2 for Q1 by the user to mean that Q2 is a potential expansion candidate for Q1. In some embodiments, the candidate generator module 450 may be configured to generate the query expansion source and candidate by learning from the item listing data stored in data store 430. For example, the candidate generator module 450 may be configured to generate the query expansion source and candidate by learning acronyms from an item listing title. In an item listing title "new 60 GB PlayStation 3 (PS3)," "PS3" may be interpreted by the candidate generator module 450 to be an acronym for "PlayStation 3," As a result, "PlayStation 3" may be interpreted to be a potential expansion candidate for "PS3."

In some embodiments, the system 400 may also comprise a feature extractor module 440 configured to extract the feature data from data of an e-commerce website. This data of the e-commerce website may comprise user behavioral data and/or item listing data, for example, the user behavioral data and item listing data discussed above. In some embodiments, a search engine of an e-commerce website may index item listing data that is submitted by sellers of the item listings. Each item listing may be modeled as a set of name value pairs $\{N_1, V_1>, <N_2, V_2>, \ldots <N_m, V_m>\}$. In some embodiments, item listing data comprises a title of an item, a textual description of the item, category information of the item (e.g., Toys, Clothing, Electronics, etc.), and structural data associated with the item (e.g., Brand=Nike or Hull Material=Fiberglass). The search engine (e.g., navigation application(s) 214) of the e-commerce website may provide a host of operations that can be accessed by the feature extractor module 440 and/or the query expansion classifier module 410. For example, in some embodiments, given a query, the search engine can list the set of item listings that contain the keywords in the query. In some embodiments, given a query, the search engine can provide the category histogram that represents the category distribution of the item listings that match the query. It is contemplated that other operations may be provided by the search engine of the e-commerce website as well.

As previously discussed, the feature data may comprise information for a plurality of features, and an analysis of the information for the plurality of features may be used by the query expansion classifier module 410 to determine whether the query expansion candidate qualifies as an expansion of the query expansion source. Examples of features that may be used in the plurality of features are discussed below. It is contemplated that the plurality of features used to determine whether a query expansion candidate qualifies as an expansion may comprise any one or combination of these examples. Furthermore, it is contemplated that the plurality of features may comprise other features that are not discussed within the present disclosure. In the discussion of the plurality of features below, K1 and K2 are used to refer to the query expansion source and candidate (e.g., keyword phrases), respectively, for which a determination of expansion qualification may be made. In some embodiments, the functionality of an e-commerce websites search engine may be used to calculate a feature for K1 and K2.

In some embodiments, the plurality of features may comprise a measure of co-occurrence for the query expansion source and the query expansion candidate in item listings of an e-commerce website. This metric may be used to determine if the co-occurrence of the query expansion source and candidate in the same document (e.g., an item listing) or a particular portion of the same document (e.g., the item description section of the item listing) is significantly more than the random chance of them co-occurring. This feature works on the principle that two keyword phrases are synonymous, or otherwise significantly related, if they tend to co-occur (e.g., in text such as item descriptions) with probability more than the random chance of them co-occurring together. This feature may be calculated using the following mathematical expression:

$$\log_2 N_i \frac{n_{12}}{n_1 * n_2}$$

where $N_i$ is the total number of item listings, $n_{12}$ is the number of item listings that contains both keyword phrases $K_1$ and $K_2$, $n_1$ is the number of item listings that contain the keyword phrase $K_1$, and $n_2$ is the number of item listings that contain the keyword phrase $K_2$.

In some embodiments, the plurality of features may comprise a measure of neighborhood similarity for the query expansion source and the query expansion candidate. The measure of neighborhood similarity may be a measure of similarity of words that surround both the query expansion source and the query expansion candidate within a window span of a predetermined number of words in item listings of an e-commerce website. This feature works on the principle that two keyword phrases are synonymous, or otherwise significantly related, if they share a large number of neighbors. Neighbors are words that surround the keyword phrases within a window span of a tunable constant of words. For example, it may be determined that words that surround the keyword phrases within a window span of two words are neighbors of the keyword phrases. For an item listing title "new 60 GB PlayStation 3 PS3 Slim charcoal black" where the window span for neighbors is two words, the neighbors of "PS3" are {3, slim, PlayStation, charcoal}. The neighborhood similarity metric may be calculated using the following mathematical expression:

$$\frac{|K_1| \cap |K_2|}{\min(|K_1|, |K_2|)}$$

where $|K_1|$ and $|K_2|$ represent the set of neighbors for keyword phrases $K_1$ and $K_2$, respectively, and the min function returns the minimum cardinality of the two sets.

In some embodiments, the plurality of features may comprise a measure of category divergence for the query expansion source and the query expansion candidate. The item listings of an e-commerce website may be labeled with a category (e.g., Shoes, Jackets, etc.). The measure of category divergence may be a measure of similarity between a distribution of item categories of item listings returned as results for a search on the query expansion source and a distribution of item categories of item listings returned as results for a search on the query expansion candidate. This feature works on the principle that two keyword phrases are synonymous, or otherwise significantly related, if the category distributions of their returned item listing results are similar. For example, the resulting item listings for the query "Latin dress" and the resulting item listings for the query "ballroom dress" may have similar categories (e.g., dancewear, women's clothing, etc.), and thus may be considered significantly related. On the other hand, the resulting item listings for the query "cowboy hat" and the resulting item listings for the query "Cowboys hat" may have dissimilar category distributions, as "cowboy hat" may refer to a hat worn by a cowboy, while "Cowboys hat" may refer to a hat associated with the Dallas Cowboys football team.

In some embodiments, the category divergence is a Kullback-Leibler (KL) divergence. In some embodiments, the KL divergence ($D_{KL}$) may be calculated using the following formula:

$$D_{KL}(C_1 \| C_2) = \sum_i C_1(i) \log \frac{C_1(i)}{C_2(i)}$$

where $C_1$ is the discrete leaf category probability distribution for the item listings that are returned when $K_1$ is issued as the query, and $C_2$ is the discrete category probability distribution for the item listings that are returned when $K_2$ is used as the query. The KL divergence metric may be used as a distance metric between the distributions in $C_1$ and $C_2$. The rationale is that for $K_1$ and $K_2$ to be synonyms, or otherwise significantly related, the distributions $C_1$ and $C_2$ should not be far apart. Intuitively, for $K_1$ and $K_2$ to be synonyms, query $K_1$ should not return diaper item listings while query $K_2$ returns milk product listings. $K_1$ and $K_2$ should fetch similar products.

The category divergence may be calculated at two granularities: 1) divergence for the highly-ranked items (top item divergence); and 2) divergence for all the items returned (overall divergence). Either metric or both metrics may be used as features in query expansion system 400. Calculation of category divergence for highly-ranked items may take into account the relative ordering or ranking of the item listings on the search results page so that the calculation is based on item listings that are ranked at a level on the search results page that meets a predetermined threshold (e.g., the top twenty-five item listings on the search results page).

In some embodiments, the plurality of features may comprise a measure of price divergence for the query expansion source and the query expansion candidate. The measure of price divergence may be a measure of similarity between a distribution of prices of item listings returned as results for a search on the query expansion source and a distribution of prices of item listings returned as results for a search on the query expansion candidate. This feature works on the principle that the query expansion source and candidate that are synonymous, or otherwise significantly related, should return similar item listings, and therefore, the price distribution of the item listings returned by the query expansion source and candidate should be similar. In some embodiments, the measure of price divergence for the query expansion source and the query expansion candidate comprises a relative mean difference in their price distributions, which may be calculated by taking the mean difference and dividing by the arithmetic mean.

In some embodiments, the relative ordering or ranking of the item listings on the search results page is incorporated into the measure of price divergence. In some embodiments, in order to capture the price divergence of the query expansion source and candidate relative to the position of the item listings, a factor based on a Student's T-Statistic of the pairwise comparison of item listing prices may be introduced. For example, given two paired sets of prices $P_{1i}$ and $P_{2i}$, with $\overline{P}_1$ and $\overline{P}_2$ being the respective means, a T-statistic t may be calculated using the following equation:

$$t = (\overline{P_1} - \overline{P_2}) \sqrt{\frac{n(n-1)}{\sum_{i=1}^{n}(\hat{P}_1 - \hat{P}_2)^2}}$$

where $\hat{P}_1 = (P_{1i} - \overline{P}_1)$ and $\hat{P}_2 = (P_{2i} - \overline{P}_2)$.

It is contemplated that other features may be used by the query expansion classifier module 410 to determine whether the query expansion candidate qualifies as an expansion of the query expansion source. The query expansion classifier module 410 may make the determination based, at least in part, on an analysis of whether one or more feature metrics meet a predetermined threshold (e.g., are the measure of co-occurrence and the measure of neighborhood similarity high enough).

It is contemplated that query expansion classifier module 410 may receive the query expansion source, the query expansion candidate, and the corresponding feature data in a variety of ways. In some embodiments, the query expansion source and candidate may be tagged with the feature data. In some embodiments, the query expansion source and candidate may be generated by the candidate generator module 450, and then sent to the feature extractor module 440, where they may be tagged with the feature data. The query expansion source and candidate tagged with the feature data may then be sent from the feature extractor module 440 to the query expansion classifier module 410. In some embodiments, the candidate generator module 450 may send the query expansion source and candidate to the query expansion classifier module 410 and the feature extractor module 440 may send the feature data to the query expansion classifier module 410. It is contemplated that other configurations may be employed as well.

As previously discussed, the query expansion classifier module 410 may be configured to assign the query expansion candidate as an expanded query of the query expansion source in the query expansion dictionary 420 in response to a determination that the query expansion candidate qualifies as an expansion of the query expansion source. In some embodiments, the query dictionary 420 is configured to store original queries and an expanded query for each original query. Each expanded query may comprise additional or alternative terms that may be used in executing a search when a user submits the corresponding original query. For example, if the query expansion candidate is assigned as an expansion of the query expansion source, when a user submits the query expansion source for search, the search engine may execute a search using the query expansion source and the query expansion candidate. In some embodiments, the additional or alternative terms of the expanded query may be used in executing the search when the user submits a query that matches the entire original query in the query expansion dictionary 420 (e.g., "dresses" matches the entirety of "dresses"). In some embodiments, the use of the additional or alternative terms of the expanded query in executing the search may depend upon what the other terms in the query are and/or what category the user is searching in. In some embodiments, the additional or alternative terms of the expanded query may be used in executing the search when the user submits a query that comprises the original query in addition to one or more other terms. For example, if the query expansion dictionary 420 comprises an expansion from "dresses" to "dress," this expansion may be applied not only to the query "dresses," but also to any query that comprises the term "dresses." In this example, the query "red dresses" may result in expanding the query to include "red dress."

In some embodiments, the system 400 may further comprise a navigation module 470, which may employ one or more navigation applications (e.g., navigation application(s) 214 in FIG. 2). The navigation module 470 may be executable by at least one processor and configured to receive a search query from a user 460 on a client device. If the search query submitted by the user 460 matches an original query for which an expanded query exists, the navigation module 470 may execute a search using the corresponding expanded query, and may provide the results of that search to the user 460 on the client device. In some embodiments, the navigation module 470 may retrieve the expanded query from the query dictionary 420.

Using an expanded query may provide more search results to the user 460. For example, if user 460 submits "espresso spoons" as an original query, the user 460 may be provided with 112 item listings as search results without an expanded query. However, if the original query is expanded to also comprise "mini spoons," the user 460 may be provided with 294 item listings as search results. This increase in the recall set may provide the user 460 with better deals and an increase in revenue for the e-commerce site and the sellers of item listings.

Figure 5:
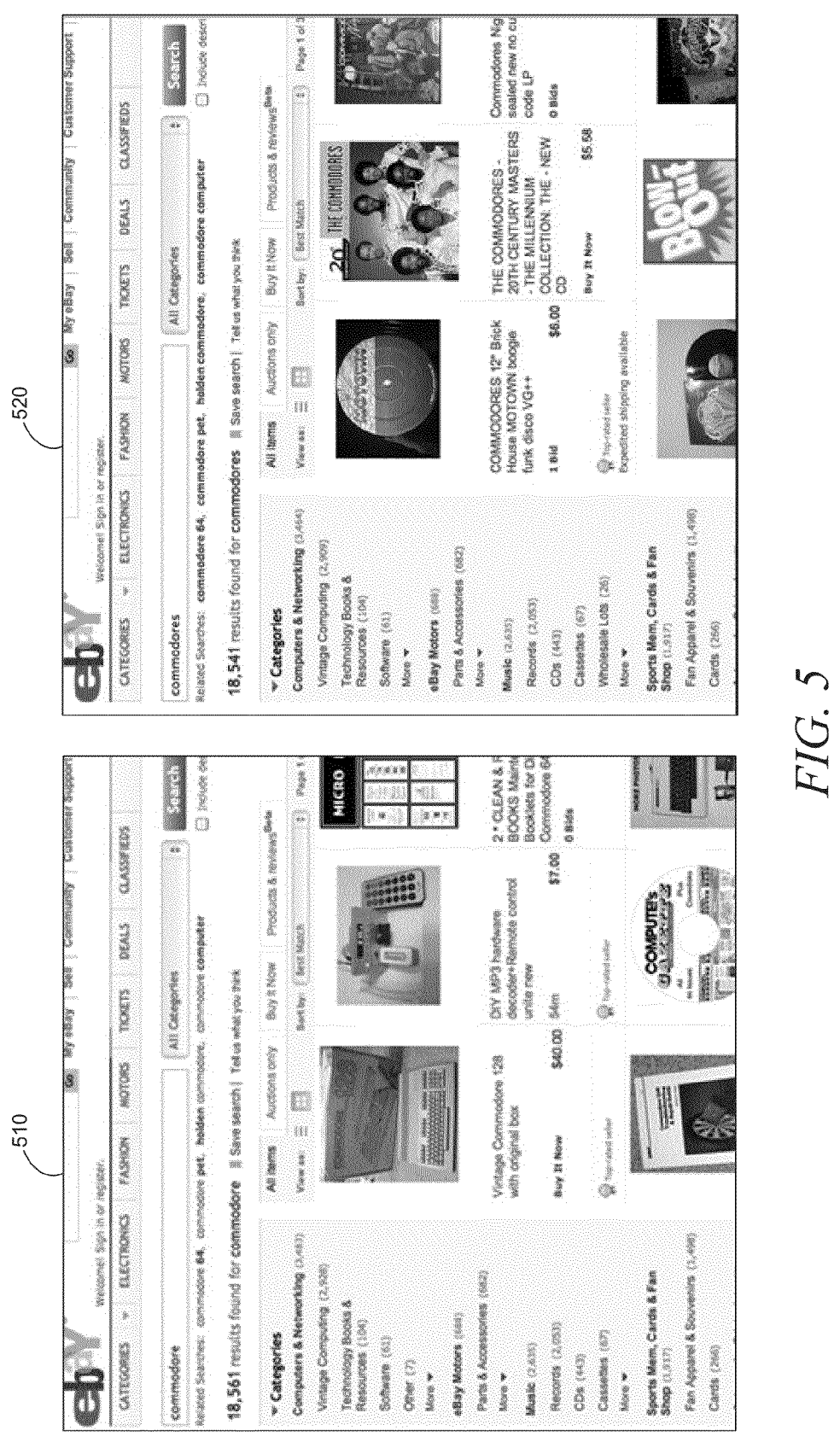

However, not all query expansion candidates should be used in an expanded query for an original query. While "personal watercraft" may be a good expansion candidate for "jet ski" and "ballroom dress" may be a good expansion candidate for "Latin dress," other query expansion candidates may lead to poor search results. These query expansion source and candidate pairings that lead to poor search results may be referred to as false positive query expansion pairs. False positive query expansion pairs are keyword phrases that may at first appear to be good query expansion source and candidate pairings for returning related search results, but that actually return less than a desirable number of related search results. FIG. 5 illustrates an example embodiment of search results for a false positive query expansion pair. As seen in screenshot 510 of FIG. 5, the user (e.g., user 460) may submit "commodore" as the search query and be presented with item listings that relate to the Commodore brand of computers as the best matches for the query. A simple modification of the query "commodore" may be to pluralize it to "commodores" for an expanded search query. However, as seen in screenshot 520 of FIG. 5, the user may submit "commodores" as the search query and be presented with item listings that relate to the musical group The Commodores as the best matches for the query. In this example, "commodore" and "commodores" are a false positive query expansion pair that would not make good query expansions of one another. Using the plurality of features, as discussed above, in determining which query expansion candidates to assign as expanded queries of an original query may significantly reduce the chances of these types of false positive query expansion situations.

Furthermore, while the query expansion candidate may be determined to qualify as an expansion of the query expansion source, the reverse may not be true in certain situations. In this respect, query expansions may be directional. The query expansion candidate may qualify as an expansion of the query expansion source, but the query expansion source may not qualify as an expansion of the query expansion candidate. In some embodiments, expanding from general to specific may be appropriate, while expanding from specific to general may not be appropriate. For example, expanding the query "OSU" to "Ohio State University" may lead to good search results, but expanding the query "Ohio State University" to "OSU" may not lead to good search results as it may return results for Oregon State University, Oklahoma State University, and other unrelated results.

In some embodiments, an updated version of the query dictionary 420, reflecting the creation, addition, or removal of a query expansion candidate to an expanded query of an original query, may be subjected to a quality assurance process before being available for normal use on the e-commerce website. For example, following one or more assignments of a query expansion candidate as an expanded query of an original query in the query dictionary 420, any new expanded queries may be subjected to an evaluation based on human judgment, where a person may review the new expanded queries and decide whether the update to the query dictionary 420 is acceptable or not. In some embodiments, A/B testing may be performed to compare the effectiveness of the query dictionary 420 before the update and the effectiveness of the query dictionary 420 after the update. In some embodiments, the newly assigned query expansion candidates may be exposed to a small percentage of traffic of the e-commerce website. In some embodiments, an analysis is performed on how any updates may affect user behavior (e.g., click-through rate of item listings) and the effect any updates may have on revenue to the sellers of item listings. In some embodiments, the updated version of the query dictionary 420 may be implemented into the e-commerce website after the quality assurance process has determined that the updated version meets a particular standard. In some embodiments, poorly performing query expansion candidates are removed from being expanded queries in the query dictionary 420.

Figure 6:
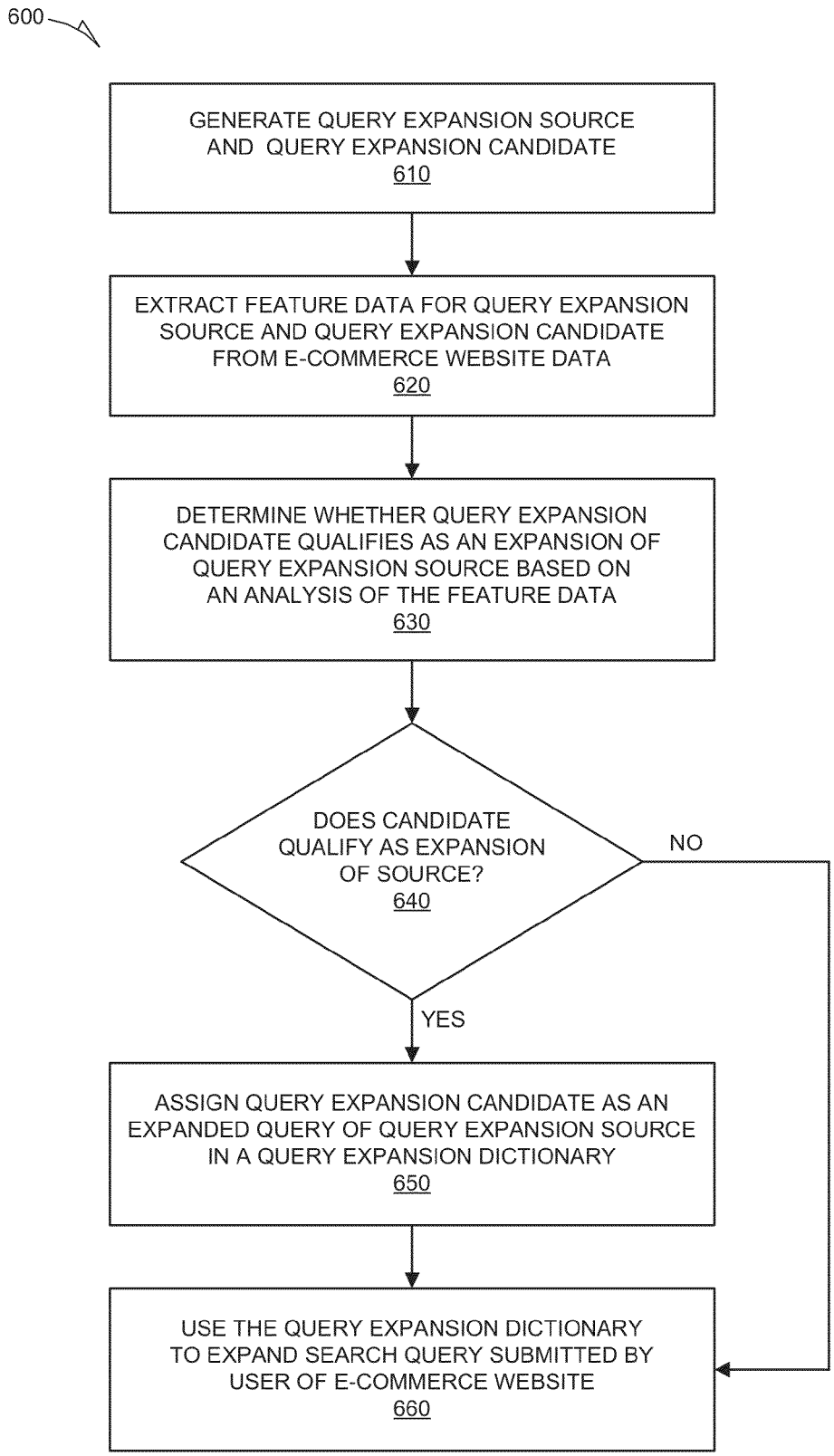
FIG. 6 is a flowchart illustrating an example method of query expansion.

FIG. 6 is a flowchart illustrating an example method 600 of query expansion. The operations of method 600 may be performed by a system or modules of a system (e.g., system 400 or any of its modules).

At operation 610, a query expansion source and a query expansion candidate are generated. In some embodiments, the query expansion source and the query expansion candidate are generated by the candidate generator module 450 in FIG. 4. In some embodiments, the query expansion source and candidate are generated using data of an e-commerce website some embodiments, this data comprises user behavioral data and/or item listing data.

At operation 620, feature data is extracted for the query expansion source and candidate. In some embodiments, the feature data is extracted by the feature extractor module 440 in FIG. 4. In some embodiments, the feature data may be extracted from data of the e-commerce website (e.g., user behavioral data, item listing data, etc.) and may comprise information for a plurality of features. As previously discussed, the features may include, but are not limited to, a measure of co-occurrence, a measure of neighborhood similarity, a measure of category divergence, and a measure of price divergence.

At operation 630, it is determined whether the query expansion candidate qualifies as an expansion of the query expansion source. In some embodiments, this determination operation may be performed by the query expansion classifier module 410 in FIG. 4. This determination may be made based on an analysis of the feature data. In some embodiments, this determination may be based, at least in part, on an analysis of whether one or more feature metrics meet a predetermined threshold.

At operation 640, if it has been determined that the query expansion candidate qualifies as an expansion of the query expansion source, then the method 600 proceeds to operation 650, where the query expansion candidate is assigned as an expanded query of the query expansion source in a query expansion dictionary (e.g., the query dictionary 420 in FIG. 4). In some embodiments, the query expansion candidate may be assigned as an expanded query of the query expansion source in the query expansion dictionary using the query expansion classifier module 410 in FIG. 4.

At operation 660, the query expansion dictionary is used to expand a search query submitted by a user of the e-commerce website. For example, if the query expansion candidate was assigned as an expanded query of the query expansion source in the query expansion dictionary and the search query submitted by the user matches, or otherwise comprises, the query expansion source, then the e-commerce website may use the query dictionary to expand the user's search query to include the query expansion candidate.

At operation 640, if it has been determined that the query expansion candidate does not qualify as an expansion of the query expansion source, then the method 600 proceeds to operation 660, where the query expansion dictionary, without the query expansion candidate being assigned as an expanded query of the query expansion source, is used to expand a search query submitted by a user of the e-commerce website. Although the query expansion dictionary does not expand a search query that matches, or otherwise comprises, the query expansion source to include the query expansion candidate in this situation, other expanded query relationships in the query dictionary may be used to expand the search query submitted by the user.

Modules, Components and Logic

Certain embodiments are described herein as including logic or a number of components, modules, or mechanisms.

Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g. APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
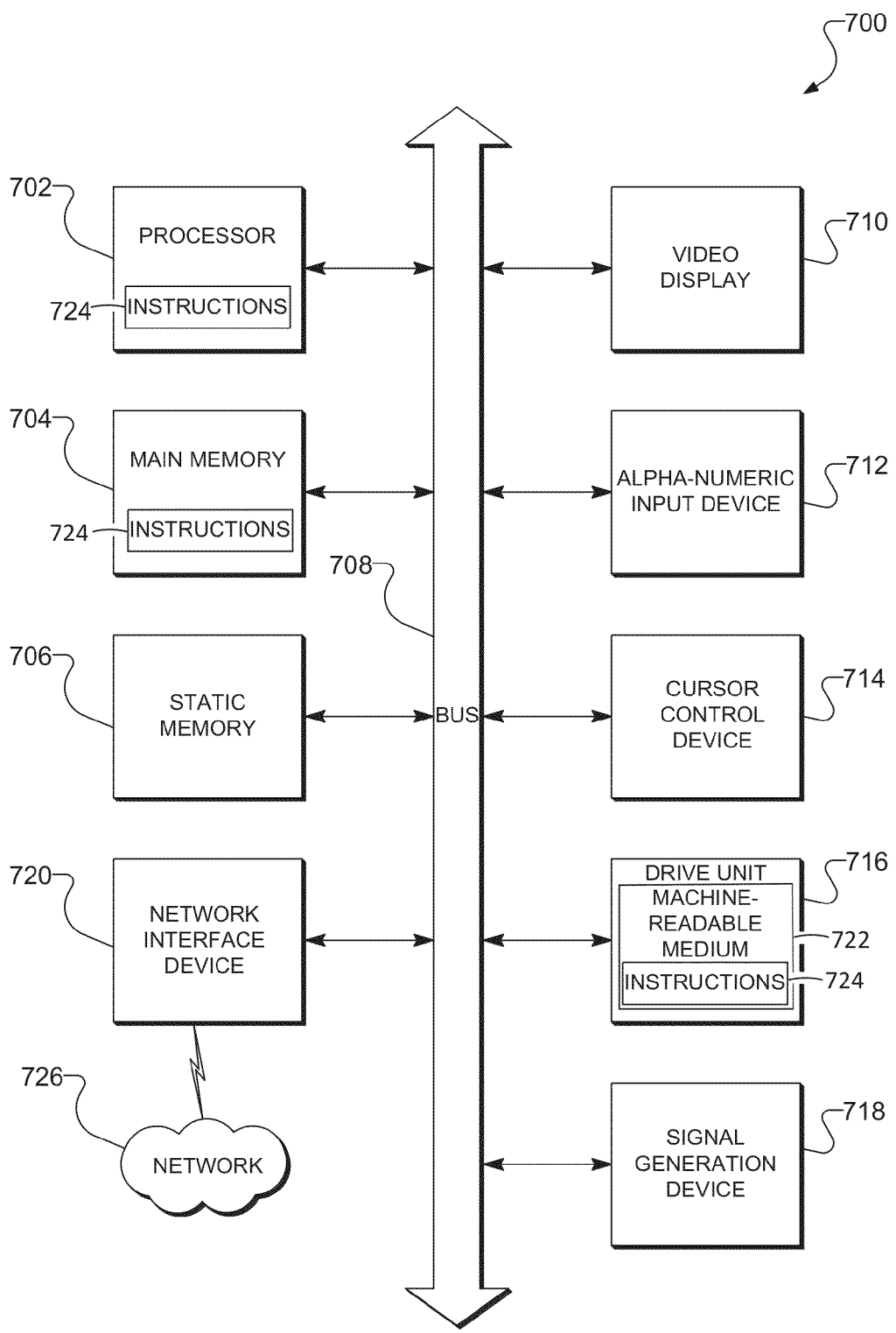
FIG. 7 shows a diagrammatic representation of a machine in the example form of a computer system within which a set of instructions may be executed to cause the machine to perform any one or more of the methodologies discussed herein.

FIG. 7 is a block diagram of a machine in the example form of a computer system 700 within which instructions 724 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface WI) navigation (or cursor control) device 714 (e.g., a mouse), a disk drive unit 716, a signal generation device 718 (e.g., a speaker) and a network interface device 720.

Machine-Readable Medium

The disk drive unit 716 includes a machine-readable medium 722 on which is stored one or more sets of data structures and instructions 724 (e.g., software) embodying or utilized by any one or more of the methodologies Or functions described herein. The instructions 724 may also reside, completely or at least partially, within the main memory 704 and/or within the processor 702 during execution thereof by the computer system 700, the main memory 704 and the processor 702 also constituting machine-readable media. The instructions 724 may also reside, completely or at least partially, within the static memory 706.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding, or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions fix execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   at least one processor; and
   a query expansion classifier module, executable by the at least one processor, configured to:
   receive a query expansion source, a query expansion candidate, and feature data for the query expansion source and the query expansion candidate, the feature data comprising information for a plurality of features, the plurality of features comprising a measure of price divergence for the query expansion source and the query expansion candidate, the measure of price divergence being a measure of similarity between a distribution of prices of item listings returned as results for a search on the query expansion source and a distribution of prices of item listings returned as results for a search on the query expansion candidate, and the measure of price divergence comprising a Student's t-statistic;
   determine whether the query expansion candidate qualifies as an expansion of the query expansion source based on an analysis of the information for the plurality of features; and
   assign the query expansion candidate as an expanded query of the query expansion source in a query expansion dictionary in response to a determination that the query expansion candidate qualifies as an expansion of the query expansion source.

2. The system of claim 1, further comprising a feature extractor module configured to extract the feature data from data of an e-commerce website, the data of the e-commerce website comprising at least one of user behavioral data and item listing data.

3. The system of claim 1, wherein the plurality of features comprises a measure of co-occurrence for the query expansion source and the query expansion candidate in item listings of an e-commerce website.

4. The system of claim 1, wherein the plurality of features comprises a measure of neighborhood similarity for the query expansion source and the query expansion candidate, the measure of neighborhood similarity being a measure of similarity of words that surround both the query expansion source and the query expansion candidate within a window span of a predetermined number of words in item listings of an e-commerce website.

5. The system of claim 1, wherein the plurality of features comprises a measure of category divergence for the query expansion source and the query expansion candidate, the measure of category divergence being a measure of similarity between a distribution of item categories of item listings returned as results for a search on the query expansion source and a distribution of item categories of item listings returned as results for a search on the query expansion candidate.

6. A computer-implemented method comprising:
   receiving a query expansion source, a query expansion candidate, and feature data for the query expansion source and the query expansion candidate, the feature data comprising information for a plurality of features, the plurality of features comprising a measure of price divergence for the query expansion source and the query expansion candidate, the measure of price divergence being a measure of similarity between a distribution of prices of item listings returned as results for a search on the query expansion source and a distribution of prices of item listings returned as results for a search on the query expansion candidate, and the measure of price divergence comprising a Student's t-statistic;
   determining whether the query expansion candidate qualifies as an expansion of the query expansion source based on an analysis of the information for the plurality of features; and
   assigning the query expansion candidate as an expanded query of the query expansion source in a query expansion dictionary in response to a determination that the query expansion candidate qualifies as an expansion of the query expansion source.

7. The method of claim 6, wherein the feature data is extracted from data of an e-commerce website, the data of the e-commerce website comprising at least one of user behavioral data and item listing data.

8. The method of claim 6, wherein the plurality of features comprises a measure of co-occurrence for the query expansion source and the query expansion candidate in item listings of an e-commerce website.

9. The method of claim 6, wherein the plurality of features comprises a measure of neighborhood similarity for the query expansion source and the query expansion candidate, the measure of neighborhood similarity being a measure of similarity of words that surround both the query expansion source and the query expansion candidate within a window span of a predetermined number of words in item listings of an e-commerce website.

10. The method of claim 6, wherein the plurality of features comprises a measure of category divergence for the query expansion source and the query expansion candidate, the measure of category divergence being a measure of similarity between a distribution of item categories of item listings returned as results for a search on the query expansion source and a distribution of item categories of item listings returned as results for a search on the query expansion candidate.

11. A non-transitory machine-readable storage device storing a set of instructions that, when executed by at least one processor, causes the at least one processor to perform operations comprising:
    receiving a query expansion source, a query expansion candidate, and feature data for the query expansion source and the query expansion candidate, the feature data comprising information for a plurality of features, the plurality of features comprising a measure of price divergence for the query expansion source and the query expansion candidate, the measure of price divergence being a measure of similarity between a distribution of prices of item listings returned as results for a search on the query expansion source and a distribution of prices of item listings returned as results for a search on the query expansion candidate, and the measure of price divergence comprising a Student's t-statistic;
    determining whether the query expansion candidate qualifies as an expansion of the query expansion source based on an analysis of the information for the plurality of features; and
    assigning the query expansion candidate as an expanded query of the query expansion source in a query expansion dictionary in response to a determination that the query expansion candidate qualifies as an expansion of the query expansion source.

12. The device of claim 11, wherein the feature data is extracted from data of an e-commerce website, the data of the e-commerce website comprising at least one of user behavioral data and item listing data.

13. The device of claim 11, wherein the plurality of features comprises a measure of co-occurrence for the query expansion source and the query expansion candidate in item listings of an e-commerce website.

14. The device of claim 11, wherein the plurality of features comprises a measure of neighborhood similarity for the query expansion source and the query expansion candidate, the measure of neighborhood similarity being a measure of similarity of words that surround both the query expansion source and the query expansion candidate within a window span of a predetermined number of words in item listings of an e-commerce website.

15. The device of claim 11, wherein the plurality of features comprises a measure of category divergence for the query expansion source and the query expansion candidate, the measure of category divergence being a measure of similarity between a distribution of item categories of item listings returned as results for a search on the query expansion source and a distribution of item categories of item listings returned as results for a search on the query expansion candidate.

* * * * *